(12) United States Patent
Karaaslan, Jr.

(10) Patent No.: US 11,405,761 B2
(45) Date of Patent: Aug. 2, 2022

(54) ON-BOARD MACHINE VISION DEVICE FOR ACTIVATING VEHICULAR MESSAGES FROM TRAFFIC SIGNS

(71) Applicant: Connected Wise LLC, Orlando, FL (US)

(72) Inventor: Enes Karaaslan, Jr., Orlando, FL (US)

(73) Assignee: CONNECTED WISE LLC, Orlando, FL (US)

( * ) Notice: Subject to any disclaimer, the term of this patent is extended or adjusted under 35 U.S.C. 154(b) by 0 days.

(21) Appl. No.: 16/882,881

(22) Filed: May 26, 2020

(65) Prior Publication Data

US 2020/0374674 A1    Nov. 26, 2020

Related U.S. Application Data

(60) Provisional application No. 62/852,252, filed on May 23, 2019.

(51) Int. Cl.
| | |
|---|---|
| *H04W 4/44* | (2018.01) |
| *G01S 19/01* | (2010.01) |
| *G05D 1/00* | (2006.01) |
| *B60T 7/16* | (2006.01) |
| *B60T 8/17* | (2006.01) |
| *G08G 1/0962* | (2006.01) |
| *G06V 10/143* | (2022.01) |
| *G06V 20/58* | (2022.01) |

(52) U.S. Cl.
CPC ............. *H04W 4/44* (2018.02); *B60T 7/16* (2013.01); *B60T 8/1701* (2013.01); *G01S 19/01* (2013.01); *G05D 1/0022* (2013.01); *G06V 10/143* (2022.01); *G06V 20/582* (2022.01); *G08G 1/09623* (2013.01)

(58) Field of Classification Search
None
See application file for complete search history.

(56) References Cited

U.S. PATENT DOCUMENTS

| | | | |
|---|---|---|---|
| 2017/0032402 A1* | 2/2017 | Patsiokas | G06Q 30/0207 |
| 2020/0042849 A1* | 2/2020 | Howard | G08G 1/09623 |
| 2021/0264186 A1* | 8/2021 | Wheatley | B60W 60/001 |

* cited by examiner

*Primary Examiner* — Adam D Tissot
*Assistant Examiner* — Garrett F Evans
(74) *Attorney, Agent, or Firm* — Howard M Gitten, Esq.; Lewis Brisbois Bisgaard & Smith LLP

(57) ABSTRACT

An infrastructure to vehicle communications system includes a full spectrum camera disposed on a vehicle. A sign, disposed away from the vehicle, includes a message thereon. The sign reflecting visible light, and at least a portion of the message being an optical code; the optical code not reflecting visible light and reflecting invisible light. The full spectrum camera captures the image of the sign including the optical code. A smart vision device receives the image and determines the existence of the sign from the reflected visible light and the optical code thereon from the reflected invisible light. A data base stores one or more optical codes and one or more messages associated with a respective optical code, an on board unit communicating with the database and retrieves the message as a function of the optical code, and displays the message at a display in the vehicle.

10 Claims, 7 Drawing Sheets

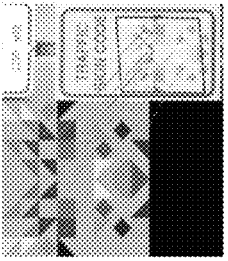
| Descriptors | Distance = 5 feet | Distance = 10 feet | Distance = 15 feet |
|---|---|---|---|
| SIFT | 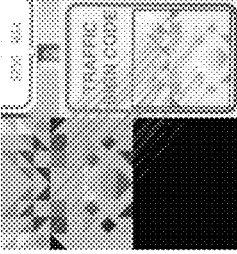 | 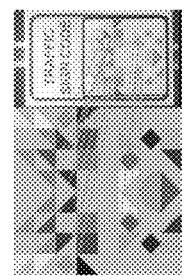 | 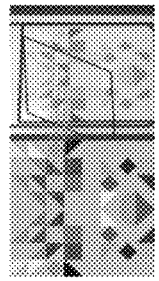 |
| SURF | 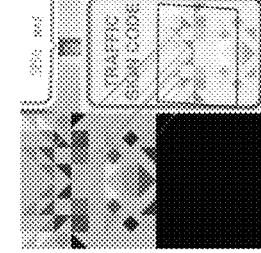 | 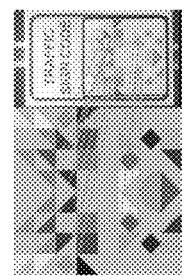 | Could not be matched. |
| ORB |  | 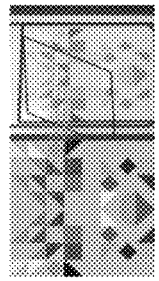 | Could not be matched. |
| AKAZE |  | Could not be matched. | Could not be matched. |
| BRISK | Could not be matched. | Could not be matched. | Could not be matched. |
Figure 5

| Environment Factors | Observed Problem | Investigated Remedy |
|---|---|---|
| Dense Fog | Haze on Images | Dehazing Filter |
| Snow | Salt Noise + High Gamma | Denoising + Gamma Correction |
| Storm | Low Gamma + Blurriness | Gamma Correction + Contrast Enhancement |
| Direct Sunlight (Over-exposure) | High Gamma | Gamma Correction |
| Cloudy Weather (Low Light) | Low Gamma | Gamma Correction |
| Night Time | Very Low Gamma | Gamma Correction + Denoising |
| High Vehicle Speed | Blurriness | Contrast Enhancement + Denoising |
| Far Away Sign | Low Resolution + Blurriness | Denoising + Contrast Enhancement |
| Occlusion on Sign | Reduced Matching Features | Contrast Enhancement |

Figure 6

ON-BOARD MACHINE VISION DEVICE FOR ACTIVATING VEHICULAR MESSAGES FROM TRAFFIC SIGNS

CROSS REFERENCE TO RELATED APPLICATION

This application claims priority to U.S. Provisional Application No. 62/852,252 filed May 23, 2019, the contents of which are herein incorporated.

BACKGROUND OF THE INVENTION

The present invention is directed to infrastructure to vehicle communications ("I2V"), and more particularly, I2V communication without the need for traditional communication infrastructure such as wireless or fiber optic communication networks.

To aid vehicular traffic and operation it is known in the art to utilize connected automated vehicle ("CAV") technology to improve traffic safety and advance the art of transportation systems. CAV systems rely on vehicular communication. However, as known in the art assisting these vehicles through the vehicular communication (I2V, vehicle to infrastructure ("V2I"), and vehicle to vehicle ("V2V")) requires substantial investment in wireless communication networks and infrastructure, especially in low population density areas. Access to power and fiber-optic infrastructure becomes a necessity to provide such communication. Therefore, the prior art suffers from the disadvantage that the availability of technology necessary for such communication is committed to those areas having proper infrastructure; high population density or wealthy areas.

The present invention overcomes the shortcomings of the prior art. In order to support this particular type of communication in areas where there is no proper infrastructure. The present invention generates the same behavior messages that are typically sent from networked world societies without the need for expensive complex communications infrastructure.

SUMMARY OF THE INVENTION

An infrastructure to vehicle communications system includes a full spectrum camera disposed on a vehicle. A sign, disposed away from the vehicle, includes a message thereon. The sign reflecting visible light, and at least a portion of the message being an optical code; the optical code not reflecting visible light and reflecting invisible light. The full spectrum camera captures the image of the sign including the optical code. An on board unit receives the image and determines the existence of the sign from the reflected visible light and the optical code thereon from the reflected invisible light. A data base stores one or more optical codes and one or more messages associated with a respective optical code, the on board unit communicating with the database and retrieving the message as a function of the optical code, and displays the message at a display in the vehicle.

During operation an on board full spectrum camera captures images from the vehicle. An onboard unit receives the images and determines the identity of the captured image as a function of reflected visible light and invisible light. Upon recognition of a sign, the image is searched in the invisible light spectrum for an optical code, disposed on the sign. The onboard unit recognizes the presence of an optical code, and when present, the optical code is compared with an onboard database of optical codes. The onboard database mapping a respective optical code to a message. The onboard unit retrieving the message associated with the recognized optical code from the data base and displaying the message at a screen on board vehicle.

In one embodiment, the invisible light is at least one of ultraviolet light and infrared light.

BRIEF DESCRIPTION OF THE DRAWINGS

The features and advantages of the present invention will become more readily apparent from the following detailed description of the invention in which like elements are labeled similarly and in which:

FIG. 5 consists of comparison of descriptors for code matching at different distances;

FIG. 6 consists of analysis of environmental factors affecting the system's performance;

DETAILED DESCRIPTION OF THE PREFERRED EMBODIMENTS

Generally the present invention provides a solution that enables vehicular messages (i.e. vehicle-to-infrastructure (V2I), infrastructure-to-vehicle (I2V), and vehicle-to-vehicle (V2V)) communication without relying on a wireless communication infrastructure. Using the power of image recognition, the present invention provides vehicular communication by activating certain vehicular messages associated with images (optical codes) that are uniquely generated using a hash visualization technique. These optical codes serve as image identifiers and can be robustly recognized by image recognition algorithms.

An artificial intelligence (AI) embedded smart machine-vision on-board device is disposed on a vehicle. Uniquely generated vehicular optical codes are placed on road signs. In this solution, the on-board device is equipped with standard-resolution full spectrum camera. In some embodiments the on board device may also include a geolocation sensor and wireless transmitter. The on board device will convey the important roadway information such as operational messages, basic safety messages, warning messages or roadway geometry messages to the driver when travelling outside of wireless communication infrastructure range.

The inventive system and method replicate some of the vehicular messages that are typically sent from road side units (RSUs) without the dedicated communications infrastructure by detecting roadway entities and recognizing the message from unique identifier signs using machine vision techniques. The system then interprets messages/optical codes disposed on the signs and transmit it to a vehicle's on-board unit (OBU).

However, the system can work as a supplement to the prior art communication systems and when the vehicle enters in range of a wireless infrastructure, the vehicle's OBU will start communicating directly with RSU and then the smart on-board vision device will stop transmitting messages. The device can nevertheless request certain system updates to its libraries when the OBU shows availability of secure connection to a central information and communication (ICT) network locations.

Figure 1:
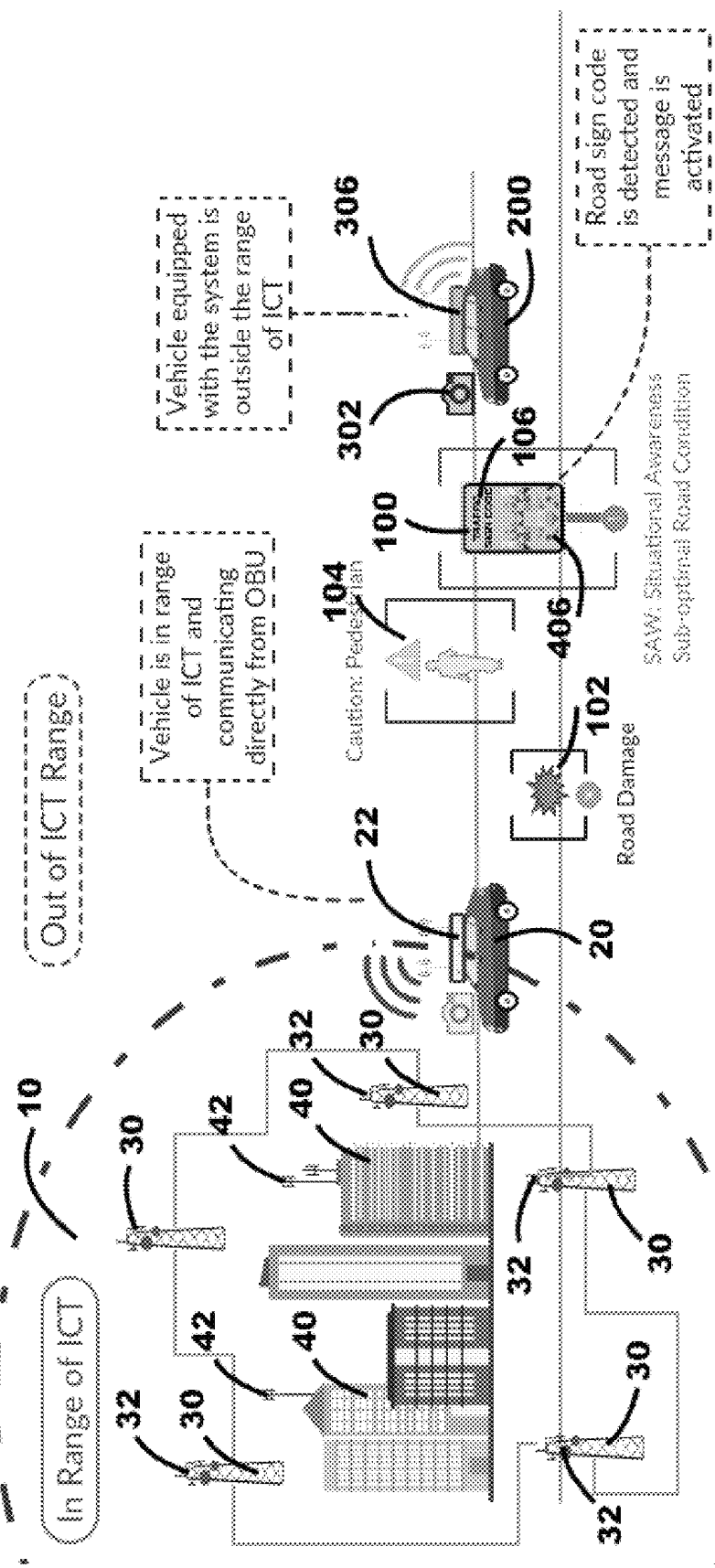
FIG. 1 is an operational diagram showing a system and use in an environment in accordance with the invention as compared to a prior art system.

Reference is now made to FIG. 1 in which a schematic representation of the prior art environment and the operation of the invention outside of the prior art environment is provided. As discussed above, the prior art environment includes an information and communication networks (ICT) 10. ICT 10 includes an integrated communications network, including a number of towers 30 having antennas 32 for transmitting and receiving signals with a vehicle 20 having a prior art system 22 thereon. Similarly, in densely populated areas a number of buildings 40 may also have antennas 42 for receiving and transmitting signals with system 22 of vehicle 20 and vehicle 20 will receive information as known in the art.

However, as discussed above outside of the ICT enabled environment, wireless communication is unavailable and the prior art system 22 cannot operate. Therefore, a car 200 having a system 300, constructed in accordance with the invention, communicates with road signs 100 to receive messages 102, 104, as will be described in detail below.

System 300 includes a full spectrum camera 302 for receiving an image of items outside of vehicle 200 which are encountered by vehicle 200 as vehicle 200 travels. System 300 is capable of identifying the presence of a sign 100 captured by camera 302 as well as the information disposed thereon. In a preferred embodiment of the invention, the sign 100 will have visible information 106 and an invisible optical code 400.

As will be described in detail below, the optical code 400 indicates to the operator of the vehicle 200 information related to operation of vehicle 200, such as pedestrian traffic is in the area (warning 104), is road damage ahead (warning 102). It should be known, that in one embodiment of the invention, full-spectrum camera 302 captures images and system 300 determines what is in the image such as sign 100, or an actual pedestrian, or even the condition of a traffic light (red, green or yellow).

Furthermore, system 300, in a preferred nonlimiting embodiment is incorporated as a compliment to prior art system 22 so that system 300 takes over when out of range of an ICT 10, but operates in a manner in accordance with the prior art when vehicle 200 is in range of an ICT 10 and RSU signals are detected.

Generally, machine readable optical codes are helpful in conveying small information in a visual form. This information can be an URL or product identification. In the last decade, the use of 2D matrix codes has gained popularity with the use of QR codes in mobile applications. QR codes are decoded by the mobile apps using computer vision methods instead of using a scanner that measures the reflectivity of a light beam. However, these codes are innately designed for a scanners' working principle and therefore may work inefficiently with cameras. Using these types of matrix codes for static road signs brings about challenges stemming from ambient illumination, sign deterioration, obstruction by an object such as a tree etc. When the machine code is not complete, the information/message can become invalid and may even lead to safety issues for connected vehicles.

Furthermore, the required format for a map type of message consists of relatively large character sets, which will be impractical to fit in one 2D matrix code. Lastly, these codes can easily be modified by a third party if applied to traffic signs. This security problem will also lead to further vehicle safety issues. In order to prevent all these, a special type of unique image identifier is used as the optical code 400; instead of using 2D matrix codes.

Figure 2:
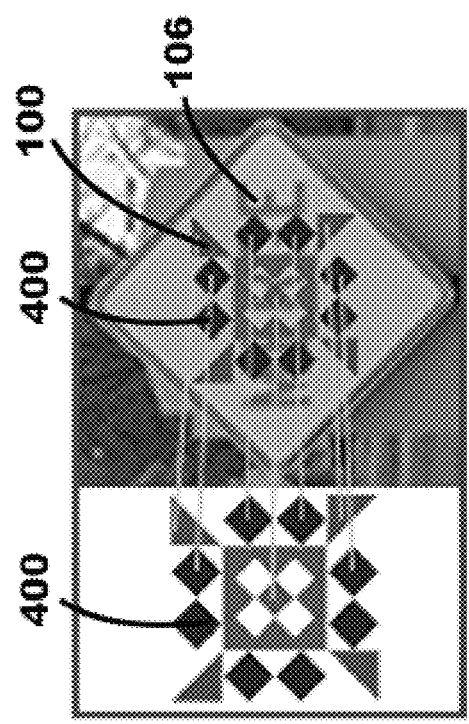
FIG. 2 is a diagram of a sign constructed in accordance with the invention.
Figure 3:
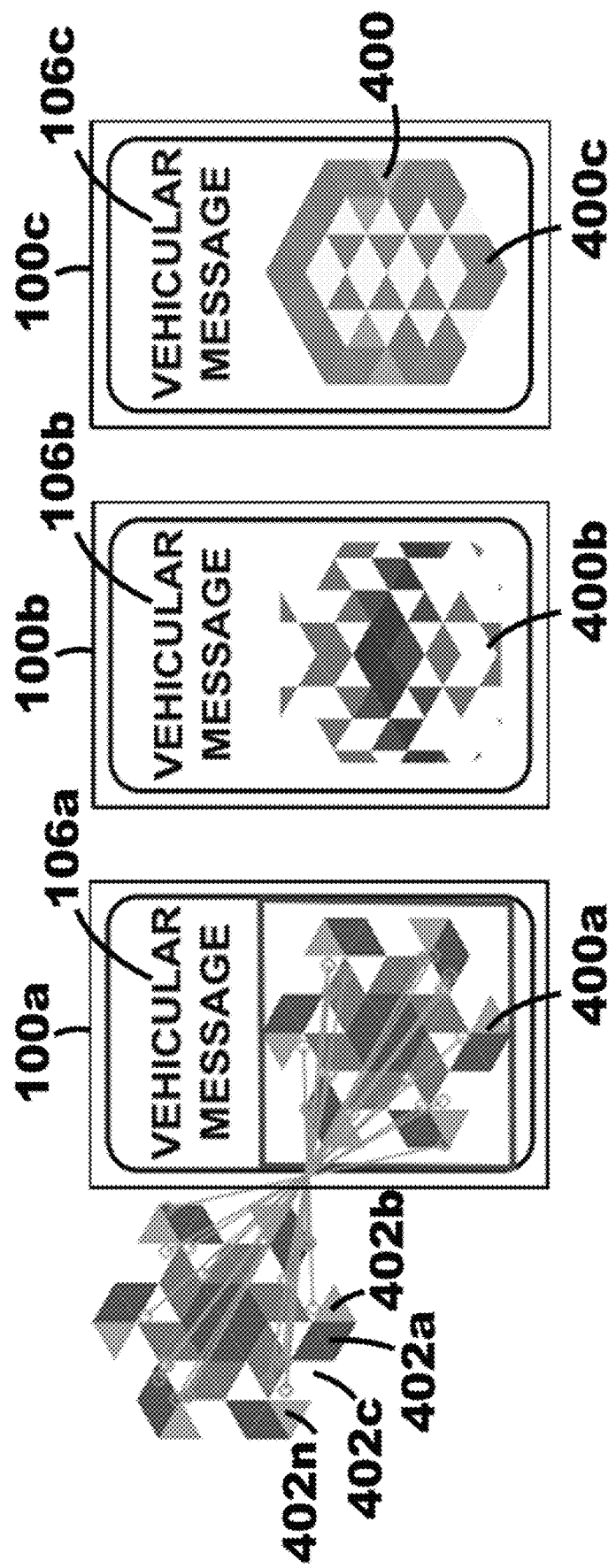
FIG. 3 is depiction of different optical codes created in accordance with the invention.

The unique image identifiers are not encoded messages but rather visual representation of encrypted hash values. Unlike 2D matrix codes, the sign message can't be altered by a third party. Once the image identifier is changed. It will not match with the corresponding identifier in the library. These image identifiers were designed to optimize the camera recognition performance at high vehicle speed and challenging environment conditions such as illumination problems, heavy climatic conditions (i.e. fog, rainstorm, and snow). As seen in FIGS. 2 and 3, the image of optical code 400 includes pattern of blocks 402a, 402b, 402c, 402n. The block sizes and the color contrast values were chosen optimally for standard resolution cameras (video resolution of 720p and 1080p) to maximize the number of matching image features. The image recognition algorithm looks for color differentiation and high visual transition contrast between adjacent blocks 402 to facilitate recognition. Additionally the optical code 400 includes redundancy to enable recognition when part of the code is blocked, covered, or occluded.

Furthermore, rather than relaying an entire vehicular message on the static sign, image identifiers will associate messages located in a database; map optical codes to associated messages for use by the vehicle operator. If a modification is needed in the message (i.e. lane geometry change, completed road construction etc.), the message database is updated when the connected vehicle is in range of an RSU. This image recognition has the following advantages:

- Designed specifically for machine vision systems for operational feasibility. The system uses identifier images that have distinct patterns and features making it more ideal for computer vision-based approaches.
- Very robust to environmental conditions such as glare, low illumination, deterioration, fog and obstruction by a tree or snow.
- No limit for message data capacity since the message is located in the device storage.
- Secure against destruction or modification by third parties since the message is only visible to the system and if the identifier image is not recognized for a reason, the message will not be activated.
- The relayed message can be modified easily without the replacement of the identifier image on the sign, therefore cost effective.
- Easily detectable by low resolution cameras, the identifier image can be even very small.
- Visually appealing designs; color spectrum, pattern and features can be customized.

To utilize the power of image recognition, unique optical codes 400 are generated for each vehicular message using hash visualization techniques. These uniquely generated optical codes 400 serve as optical codes 400 identifiers and can be robustly recognized by image recognition algorithms. However, generating the optical codes 400 with more distinct features (more corners, edges, intensity changes etc.) allows even more robust recognition.

Visual hashing is a commonly used method to identify an internet IP address with visual representation while protecting users' privacy (Haack, 2007). Visual hashing can also be used for image recognition and retrieval by converting a hash value to an image using an encryption method (Gangone, Whelan, Janoyan, & Jha, 2008). To provide safe and secure recognition of images and transmission of vehicular messages, a custom visual hashing algorithm is developed to optimize image recognition performance and to add a visually appealing look to the vehicular message signs.

An application-programming interface (API) that uses the visual hashing algorithm to generate vehicular message sign identifiers with user friendly interface is established. This API is published under BSD License 2.0, which is a part of a family of permissive free software licenses that impose minimal restrictions on the use and distribution of covered software, and will be open to all developers and agencies who intend to use it for sign identification or other similar image recognition purposes. The visual hashing algorithm uses SHA-512 encryption method, a very secure one-way hash function, for the generation of optical codes 400. Hence, a third party will not be able to reverse back to the original message by analyzing the identifier image. If a third party replaces the sign with a different identifier, the smart vision system will simply not recognize the message.

The generator API for vehicular message identifiers is designed specifically for CAV's camera recognition performance. This improved design of hash visualization entails increased robustness against occlusion (e.g. symmetrical design) and illumination changes (e.g. higher contrast difference). By geofencing, system 300 can construct the database by region so that specific optical codes 400 not only correspond to a specific message, but by knowing the physical location of vehicle 200 and the anticipated messages in the region, different messages can be associated with a single optical code and displayed as a function of location of vehicle 200. The customized API also incorporates geofencing feature and the occurrence of a mismatch is extremely unlikely for nearby signs.

A secure web-based tool will be developed in order to provide a convenient process to deploy message signs for vehicular communication applications of highway agencies, cities/counties and expressway authorities. Using this tool, a highway maintenance agency for instance, can deploy their work zone message sign by uploading the TIM message content and associate it with an automatically generated vehicular message sign.

Figure 4:
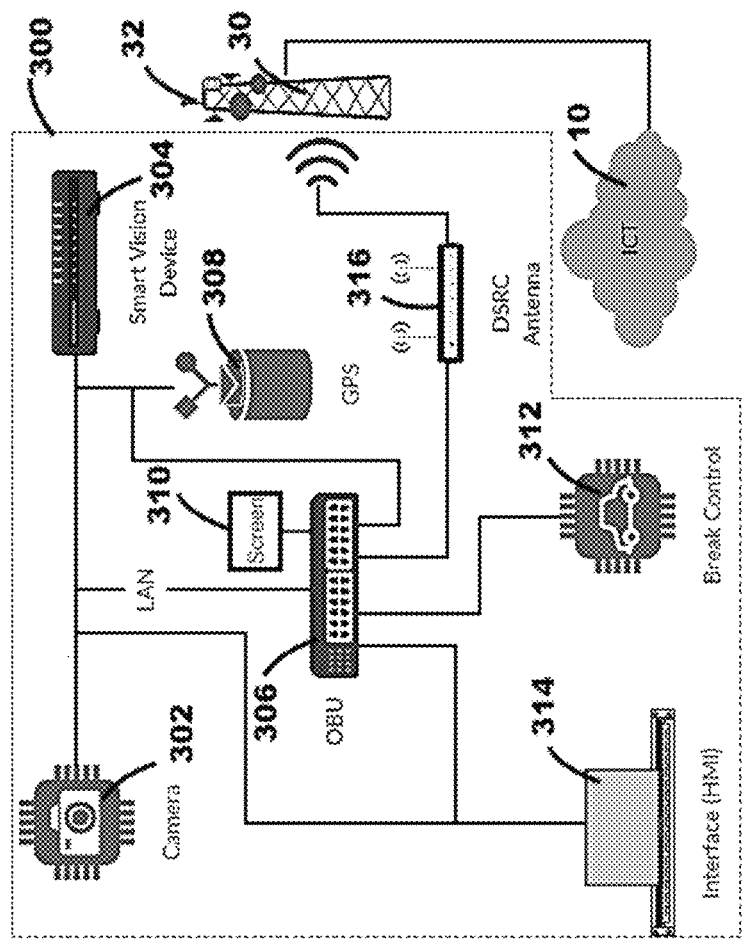
FIG. 4 is a block diagram of the onboard components of a system for operating in accordance with the invention.

Reference is now made to FIG. 4 where a block diagram of system 300 constructed in accordance with the invention is provided. System 300 includes a full spectrum camera 302 capable of capturing images in both the visible light spectrum and the invisible light spectrum. The invisible light spectrum includes at least the ultraviolet wavelengths and infrared wavelengths incapable of being seen by the human eye. Camera 302 is preferably a multi-sensor camera module for RGB, invisible light and depth sensing. The depth-sensing camera 302 provides the object distances at the standard resolution in order to replicate the necessary spacing and timing (SPaT) information for signals in the vehicular messages without compromising the overall affordability of the system. System 300 can provide 25 fps (frames per second) processing speed with the current stereo vision system.

A smart vision device 304 is coupled to camera 302 and receives the images captured by camera 302. Smart vision device 304 analyzes the images for the existence of objects of interest; those that need to be acted upon for proper operation of the vehicle 200. These objects may be signs, traffic lights, even pedestrians. Smart vision device 304 identifies these things to an on board unit (OBU) 306. When a sign is recognized smart vision device 304 then determines whether an optical code 400 is present on the sign. If so, optical code 400 is transmitted to OBU 306.

OBU 306 includes an optical code data base containing two or more distinct optical codes 400 mapped to a respective message. The messages are items of information necessary for, or of interest for, operation of vehicle 200. The messages may include driving directions (i.e. Merge, Detour, or the like), road condition (Construction, Uneven Roadway, Unpaved or the like), or warnings (pedestrian crosswalk, animal crossing, or the like). OBU 306 receives the identified optical code 400 and retrieves the corresponding message from the data base. The message may then be displayed at a screen 310 within vehicle 200, or even at a heads up display on a vehicle windshield. In an alternative embodiment the message may be output as an audio message to the operator of vehicle 200. In the current embodiment the database is part of OBU 306, bit it is well within the scope of the invention to provide a standalone database in communication with OBU 306 and/or smart vision device 304.

As discussed above smart vision device 304 recognizes real world objects such as the sign 100 itself, pedestrians in the roadway, traffic lights and like. This identification is also input to OBU 306 for processing. The OBU 306 also communicates with the operational control system of the vehicle 200 such as the braking system as now available in some cars which have autonomous braking, or a vehicle operation as known from current self driving vehicles. Therefore, OBU 306 communicates with a brake control 312, by way of example, for operating the break autonomously. Therefore, if smart vision device 304 recognizes a pedestrian in the path of vehicle 200 and transmits that image to OBU 306, if OBU 306 has not detected braking of the vehicle 200, OBU 306 will send a command to break control 312 to break vehicle 200.

System 300 may also include an interface 314 for connecting OBU 306 to other data sources and devices. In this way, OBU 306 may be updated to change the messages associated with specific optical codes 400, or to add or delete optical codes 400 over time. Additionally, in a preferred embodiment, OBU 306 keeps a log of activity for each symbol utilized and message retrieved which may be downloaded for monitoring purposes through interface 314. System 300 includes a GPS receiver 308 for determining location of vehicle 200 having system 300 thereon. In this way the database can be accessed as a function of location as well as received message.

In a preferred embodiment, the described structure and operation of system 300 is a compliment to the system 200 capable of making use of ICT 10. Therefore, system 300 may also include a dedicated short range communication antenna 306 for communicating with an antenna 32, at a tower 30 of an RSU, by way of example, to communicate with ICT 10. To that end, GPS receiver 308 may also provide an output to OBU 306, and if OBU 306 determines that it is within an ICT 10, OBU 306 operates on information received from antenna 316, rather than optical codes 400 received from camera 302. Additionally, antenna 316 receives signals from ICT 10, and upon receipt of such a signal system 300 operates in accordance with the prior art. Antenna 316 acts as a de facto switch.

For recognition of vehicular messages, a fast and robust image matching algorithm is required to compare the features of the detected sign image and optical code 400 with the features of each message identifier located in the OBU 306 database (the highest matching score is returned for the best match then the corresponding vehicular messages is found).

Recognition of roadway entities using artificial intelligence (AI) brings noteworthy capabilities to machine vision system 300, equipped with advanced camera 302 and sensor technologies, that are designed for vehicular communication. AI framework localizes the optical code 400 so that a robust code matching can be performed. When smart vision device 304 crops optical code 400 out from the camera scene, code matching by OBU 306 will be performed significantly faster and more robustly.

The AI framework utilized by smart vision device 304 can also make predictions for other vehicular message types (shown in Table 1) that are not based upon recognition of optical code 400, such as identifying an animal or pedestrian on the road. Using an AI architecture, it is possible to reinforce the performance of the code matching of the optical code 400 and detect other roadway entities such as an animal on the road or a cyclist suddenly entering an intersection as well. The AI-embedded system of smart vision device 304 analyzes the road environment and detects the roadway entities (e.g. traffic signs, vehicles, pedestrians, cyclists and traffic lights) with real-time tracking information.

TABLE 1

Applicable vehicular communication types for the on-board smart vision support system

| Vehicular Message Type | Standard | Deployment Description |
| --- | --- | --- |
| MapData Message (MAP) | SAE J2735 | MAP messages are the most convenient message types when vehicular message signs are used to relay messages to the smart vision support device. Since, navigation apps typically have issues to provide most updated road geometry in the rural areas, it is important to send this information to CAVs. The road geometry messages can be easily encoded and relayed by the V2I signs. Unsignalized road intersection geometry messages, road lane reductions and geometry changes due to road construction are some of the important applications. |
| Traveler Information Message (TIM) | SAE J2735 | These messages can be configured by following a similar approach as in MAP messages. Since temporary work zones are typically described in TIM, the geometry of the detour lanes can be sent to CAVs using vehicular message signs. |
| Personal Safety Message (PSM) | SAE J2735 | Vulnerable road users such as pedestrians, cyclists or road workers can be effectively detected and tracked in real-time by the AI system through the depth camera equipped in the smart vision device. Without use of any vehicular message sign, the position, speed and heading information of the vulnerable road users can be generated within an acceptable accuracy. |
| Road Side Alert (RSA) | SAE J2735 | RSA messages can be partially supported by the smart vision on-board device by relaying information about ice on the road or suboptimal road segment condition. However, more dynamic messages such as ambulances operating in the area or train arrival are not suitable. The vehicular message signs should be placed at locations before bridge entrances or suboptimal road segments to send activate RSA messages. |
| Dilemma Zone Protection (SA1) | ISO TS 19091 | The smart vision device can detect a yellow traffic light and estimate whether it is challenging for vehicle either to stop or continue before the signal turns red based on the current speed of the vehicle. This vehicular communication application will not require use of vehicular message signs. |
| Red Light Violation Warning (SA2) | ISO TS 19091 | This warning requires SPaT and MAP messages in real-time to notify the driver to avoid a potential red-light violation. Unlike MAP messages, SPaT messages cannot be generated directly from the vehicular message signs; however, smart vision device can replicate the SPaT by estimating the time of arrival to the traffic light in-real time. |
| Turning Assistant - Vulnerable Road User Avoidance (SA5) | ISO TS 19091 | This message is very similar to PSM messages, the application will follow a similar procedure except that a vehicular message sign will be used to send the intersection geometry MAP message. A warning signal will then be generated if the smart vision device estimates a potential conflict. |
| Non-signalized Crossing Traffic Warning (SA6) | ISO TS 19091 | Vehicular message sign is used to generate the intersection geometry message by following the same procedure as in SAE J2735 MAP messages. |

The most advanced AI models follow deep learning approaches. Deep learning is a multi-layer artificial neural networks (ANN) framework that is based on learning more complex concepts from simpler concepts. The learning occurs in deep learning models when the data acquired through experience is used to manipulate uncertainty about predictions of unavailable data (Ghahramani 2015). One of the most commonly used deep learning models is Convolutional Neural Network (CNN). CNNs are proven to be very effective in image classification and object localization tasks (Karaaslan et al. 2019). These models reached a wide range of real-world applicability from self-driving vehicles to facial recognition in surveillance systems.

For real time detection and recognition of roadway entities, a lightweight architecture that can run fast on mobile devices was selected. Single Shot MultiBox Detector (SSD)

is a relatively new, fast pipeline developed by Liu et al. (2016). SSD uses multi boxes in multiple layers of convolutional network; therefore, it has an accurate region proposal without requiring many extra feature layers. SSD predicts the location and classification of an object very quickly while sacrificing very little accuracy, as opposed to other models where significantly increased speed comes only at the cost of significantly decreased detection accuracy (Sandler et al. 2018).

The network architecture of the original SSD model is known in the art. Even though VGG-16 as a base architecture has become widely adopted classifier, newer classifiers such as MobileNetV2 offer much faster prediction speeds at similar accuracy in a fifteen times smaller network (Sandler et al. 2018).

In a preferred nonlimiting embodiment SSDlite is a mobile optimized version of SSD models that replaces all the regular convolutions with separable convolutions (Sandler et al. 2018). SSDlite is used for location and object classification and becomes more memory efficient when used with a MobileNet V2 classifier.

In addition to a road object detection model, a relatively light-weight classifier for traffic light color classification is also added to the AI framework in order to enable vehicular communication applications at signalized intersections (e.g. red-light violation warning). This classifier model was trained on an open source traffic light color classification dataset (Kato et al., 2018).

In deep learning models, the availability of training data is the most critical aspect of developing a reliable system with good accuracy in recognition. Therefore, an extensive training dataset is created by combining publicly available datasets from various sources including academic institutions, transportation agencies, and industrial partners. Some of the datasets are not annotated, whereas some others are annotated in varying formats. Therefore, a unified annotation style is chosen, and all datasets are converted to Pascal VOC 2012 format. Basic data augmentation is also applied to the datasets to further increase the training accuracy. The data augmentation included rotation, scaling, translation, and Gaussian noise. The information of the combined training datasets is summarized below.

The supervised training of the CNN models is performed in the Newton Visualization in a supercomputer. The supercomputer includes ten compute nodes with thirty two cores and 192 GB memory in each node; two Nvidia V100 GPUs are available in each compute node totaling three hundred twenty cores and twenty GPUs. One single training takes about six hours on the GPU cluster computer for total of two hundred thousand steps. A TensorFlow v2.11 machine learning framework is used for model creation and performing the model trainings (Abadi et al. 2016).

As known in the art, there are major challenges when trying to effectively train a deep learning model. One major challenge is overfitting. Overfitting usually occurs when the data is too small compared to the size of the deep learning architecture. In that case, either the number of convolutional layers should be reduced, or dropout layers should be added at the end of each convolutional block (Karaaslan et al. 2018). Another cause of overfitting is the wrong selection of training hyper-parameters. The learning rate is often chosen to be too small in order to reduce training loss. However, validation loss then becomes much larger. This indicates that the model is fitting over the branch of the loss function and not converge around the local minima. Increasing the learning rate, on the other hand, yields non-converging loss function. This indicates that the model is fitting over the branch of the loss function and not converge around the local minima. Increasing the learning rate, on the other hand, yields non-converging loss function. To overcome these challenges, learning rate scheduling and early stopping method are used during the training. The optimal hyper-parameters found for CNN models are shown in the table below.

TABLE 2

Summary of the training datasets.

| Dataset Name | Number of Classes | Dataset Size | Annotation | Reference |
| --- | --- | --- | --- | --- |
| Microsoft COCO: Common Objects in Contexts | 171 (5 classes are transferred) | 123,287 images (25,000 are in transferred classes) | Object Detection | Lin et al., (2014) |
| Berkeley Deep Drive (BDD100k) | 40 (10 classes are transferred) | 100,000 images | Object Detection | Yu et al., (2018) |
| Road Damage Dataset | 8 (2 classes are transferred) | 9,053 images (>2,000 are in transferred classes) | Object Detection | Maeda, Sekimoto, Seto, Kashiyama, & Omata, (2018) |
| Animals with Attributes | 20 (all merged in 1 class) | 37,322 images | Segmentation | Xian, Lampert, Schiele, & Akata, (2017) |

TABLE 3

Optimal hyper-parameters for CNN models

| Hyper Parameters | SSD MobileNet V1 and V2 | SSDlite MobileNet V2 | SSD ResNet50 FPN | FasterRCNN Inception V2 |
|---|---|---|---|---|
| Initial Learning Rate | 0.004 | 0.004 | 0.04 | 0.002 |
| Model Optimizer | RMS Prop Optimizer | RMS Prop Optimizer | Momentum Optimizer | Momentum Optimizer |
| Batch Size | 24 | 24 | 32 | 12 |
| Training Steps | 200,000 | 200,000 | 50,000 | 200,000 |
| Box Predictor | Kernel Size = 1 | Kernel Size = 4 | Kernel Size = 3 | Kernel Size = 2 |
| Activation | RELU | RELU | RELU | SIGMOID |

Local features of images (i.e. descriptors like corners, edges and abrupt intensity changes) are widely utilized in computer vision applications such as image classification, image retrieval, robust matching, and object localization (Li and Allinson 2008). For image matching operations, early approaches for feature detection fail to deal with illumination and scale changes while also being sensitive to noise. A breakthrough change was seen when Scale Invariant Feature Transform (SIFT) descriptors were introduced (Lowe 2004). Later, many other feature detectors/descriptors similar to SIFT were developed including SURF (Herbert Bay, Tinne Tuytelaars 2008), BRISK (Leutenegger et al. 2011), ORB (Rublee et al. 2011) and AKAZE (Min et al. 2017). When coupled with decision trees and homography transformation, these SIFT like descriptors can be effectively used in image matching operations (Muja and Lowe 2012).

For recognition of image signs 100, a fast and robust image matching algorithm—Brute Force algorithm—is used to compare the features of the detected optical code 400 with the features of each code image located in the database of system 300, and more prefer ably OBU 306. Then, the highest matching score is returned for the best code match and the corresponding V2I message is found. Robust matching is very critical since a mismatch will lead to retrieval of an incorrect V2I message from the database. The matching speed is also very important, since the code matching system on the connected vehicle will have very little amount of time to operate especially at high driving speeds. Therefore, various descriptors using different matching algorithms were tested on an exemplary optical code database and their performances are compared as shown in Table 4.

TABLE 4

Performance test on different image matching algorithms for recognition of image signs

| Feature Descriptor [1] | Algorithm [2] | Method [3] | Matching Speed [4] | Feature Density [5] | Average Precision [6] |
|---|---|---|---|---|---|
| SIFT | Brute Force | Euclidean | 0.284 s | 0.405 | 96.3% |
| SURF | Brute Force | Euclidean | 0.242 s | 0.872 | 84.9% |
| ORB | Brute Force | Hamming | 0.121 s | 0.306 | 84.0% |
| SIFT-FLANN | Decision Trees | Euclidean | 0.657 s | 0.404 | 97.5% |
| SURF-FLANN | Decision Trees | Euclidean | 0.553 s | 0.896 | 85.3% |
| BRISK-FLANN | LSH | Hamming | 0.345 s | 0.082 | 66.9% |
| ORB-FLANN | LSH | Hamming | 0.272 s | 0.427 | 84.5% |
| AKAZE-FLANN | LSH | Hamming | 0.287 s | 0.180 | 73.1% |

[1] Descriptors with FLANN uses Fast Library for Approximate Nearest Neighbors
[2] When the detected features are small, Brute Force method shows faster results than Decision Trees and LSH due to overhead of FLANN library; however, FLANN algorithms will operate much faster than Brute Force when the image sizes are large.
[3] Euclidean Distance is only applicable to SIFT/SURF, Hamming Distance is the alternative for other descriptors.
[4] Matching speed is calculated for average result time of sign images matched in a database of 300 code images.
[5] Future density is the number of good matching features normalized by the image resolution.
[6] Average precision is calculated based on 126 detected sign images being matched in a database of 300 code images.

The optimal performance has been attained from SIFT descriptors using Brute Force algorithm considering the overall speed and precision performance. Typically, FLANN is known to increase the image matching speed by finding the approximate nearest neighbors instead of trying every possibility as in Brute Force method (MUJA and Lowe 2012). However, the performance tests showed that it actually slows the overall matching speed when many small size images are matched iteratively. This is mainly due to the burden of loading its library at every iteration.

Using ORB descriptors with the Brute Force method showed a significant increase in speed, but it sacrificed some accuracy especially when the cropped image of the detected optical code 400 was very small. SURF descriptors also performed reasonably well; however, its scale invariance was not as good as SIFT. The other descriptors on the other hand, did not show any close performance.

A distance test is conducted to measure the scale invariability of the descriptors. The matching results of the SIFT, SURF, ORB, AKAZE and BRISK descriptors are compared at varying distances of 5 ft, 10 ft and 15 ft. In the comparison, good matching features above default threshold values were drawn in green color on the compared images. The homography transformation is also highlighted on the detected sign images.

As seen in FIG. 5, ORB performs the fastest; however, SURF detects a lot more features in the sign images. As shown in Table 5 both descriptors did not do as well as SIFT did with very small images. Therefore, a dynamic descriptor selection is implemented in the code recognition system. ORB is chosen to be the main descriptor and when number compared features is under a certain threshold, the system switches to SURF. If ORB does not perform a match at all, the system switches to SIFT. In this way, the speed is optimized, and the robustness of the system is maximized. The system creates a vehicular message signal when the sign image is recognized and matched with a code image in the database.

During the real-time detection of roadway objects, the traffic sign detections, including optical code 400, are extracted by smart vision device 304 and analyzed by OBU 306 using the image recognition algorithm in order to match the detection with a V2I message identifier from the database. In other words, the bounding regions of the traffic sign detections are utilized as initial region of interest for the recognition of the V2I identifiers. After the optical code 400 is recognized, the optical code 400 is transmitted to the OBU 306.

To tackle more effectively the problems related to illumination, real-time image enhancement is applied to the device's camera feed as the vehicular message sign recognition system needs to tackle abrupt brightness changes. Under reverse sunlight, poor brightness in the detected optical code 400 hides useful image features (i.e. edges and corners) and potentially causes misdetections. It is indispensable for the system to function robustly under variety of conditions, including different climates, ambient brightness, sign occlusion, and at different vehicle speeds. Therefore, real-life tests are applied.

Figure 7:
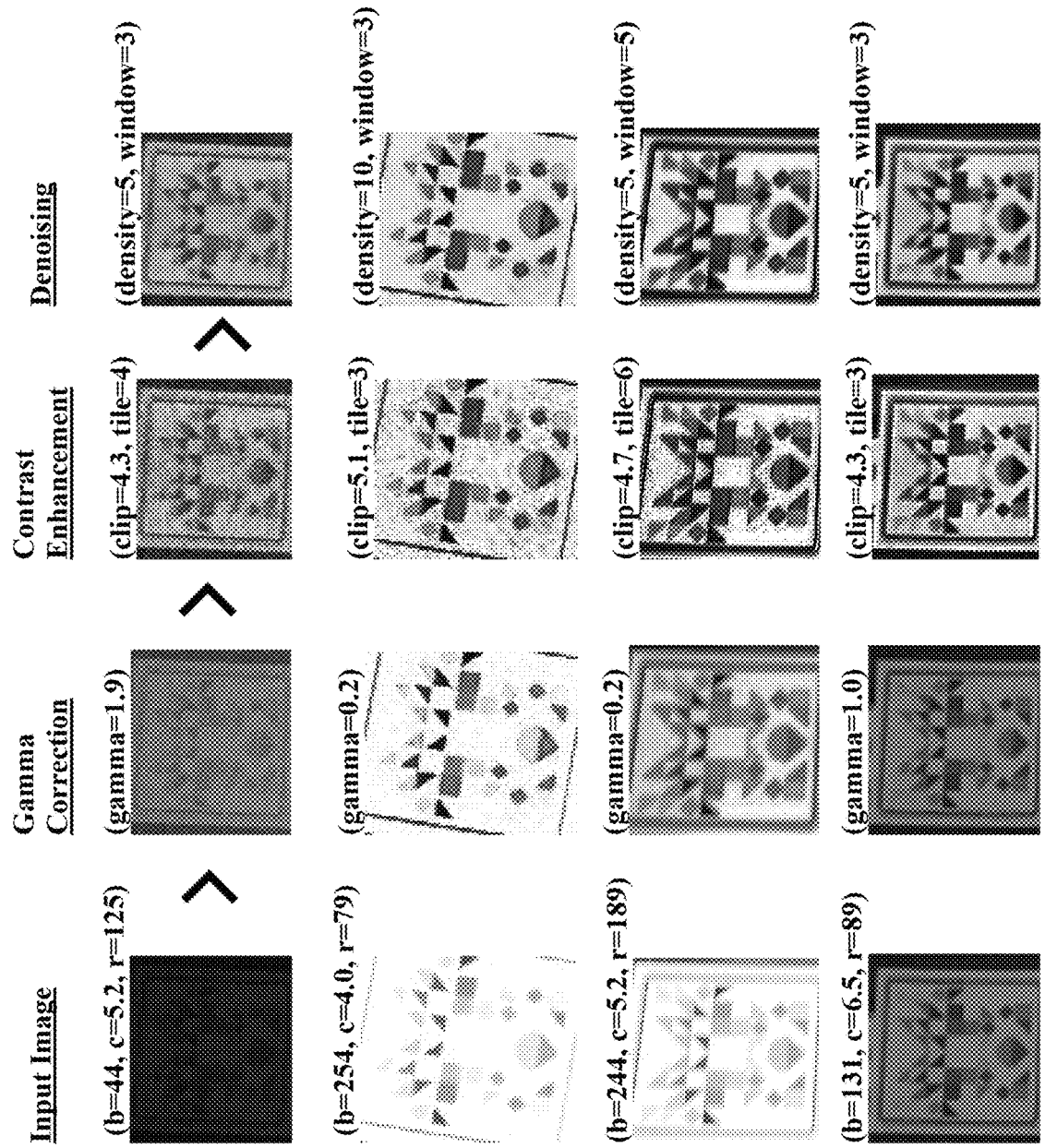
FIG. 7 consists of examples results with estimated parameters of image filtering functions.

The purpose of these tests is to observe how different environment factors are affecting the detection and recognition performance of the machine vision system. These observed factors are analyzed carefully in this task to investigate an adaptive method for remedy in each condition. First, the problem associated with each environment factor is classified as an image processing problem such as haze, noise, low/high gamma and blurriness. Then, as seen in FIG. 7, the problems are treated with effective combinations of image filtering operations. These operations are dehazing filter, denoising, gamma correction and contrast enhancement. FIG. 6 summarizes the effect of environment factors and the corresponding remedies.

In real world conditions, different environmental factors can simultaneously occur at varied levels of intensity. Therefore, effective combinations of all three filtering operations are required in order to develop an adaptive remedy strategy. Each filtering operation requires input parameters to calibrate the filtering level. These input parameters are defined as below:

Gamma Correction → $f_1\{gamma\}$

Contrast Enhancement → $f_2\{clip|tile\}$

Denoising → $f_3\{density|window\}$

Due to heavy computational burden of the dehazing filter, it is activated only during the presence of dense fog. However, other filtering functions are adaptively implemented in any environment condition by estimating the optimal input parameters. The parameter estimation is conducted using a multivariate nonlinear multiple regression analysis that predicts parameter equations based on the image variables of the detected sign. These image variables are brightness (b), contrast (c) and resolution (c). The regressions equations were predicted as below:

$$gamma = -0.008(b) + 2.12 \quad (1)$$

$$tile = -0.025(r) + 1.15 \quad (2)$$

$$window = \begin{cases} 1; & 0 < r < 70 \\ 3 & 70 \leq r < 130 \\ 5; & r \geq 130 \end{cases} \quad (3)$$

$$clip = 0.2379(c)^2 - 0.000283(b)^2 + \quad (4)$$
$$0.00554(b)(r) + 0.04938(b) - 5.32(c) + 22.63$$

$$density = \begin{cases} 5; & clip < 5 \\ 10; & clip \geq 5 \end{cases} \quad (5)$$

Predicting multi-variate non-linear equations with multiple dependent variables is a complex statistical problem. Therefore, regression functions that predict the gamma and tile parameters are assumed linear. Furthermore, the window and density parameters are assumed categorical variables. The required sample data are collected from the field tests that are conducted under varied climate and ambient light conditions. FIG. 7 shows example results from the regression functions.

The feasibility of the present invention at different vehicle speeds is ensured through the investigation of minimum size requirements for vehicular message signs. The suggested dimensions of the message signs 100 for speed limits 30 mph, 40 mph and 50 mph are determined. It must be noted that these requirements are for the default camera settings, i.e. real-time video at 1080p resolution and 25 fps rate.

The present invention can be integrated in ROS to obtain required stability, flexibility, and computational and power efficiency. ROS is a flexible robotics framework than can perform different parallel operations without compromising the system's efficiency. ROS environment is a preferred platform especially in self-driving vehicle technologies (e.g. BMW, Bosch, Google, Baidu, Toyota, GE, Tesla, Ford, Uber and Volvo). Thus, ROS will allow also compatibility to a wide range of automated driving systems in addition to entailing reliable operation of system on an actively supported platform.

The present invention collects important traffic safety data from the roadway including deterioration of road infrastructure (sign visibility and pavement damage etc.) and conflict point data (near crashes, dilemma zones, traffic congestions etc.). The present invention can determine potentially useful information types (e.g. visibility, deterioration, obstruction etc.) that can be obtained from the detected optical codes 400 of road signs 100 and also the conflict point data that is generated from the records of all vehicular message warnings in a transportation network. This conflict point data will be used to determine road-safety profiles in rural environments and will help the transportation agencies prioritize the deployment of connected infrastructure in these locations.

Operating system ensures fast, reliable, and safe operations of the present invention by building a platform environment that facilitates an application interface, a testing/troubleshooting interface, and a data collection/management interface. The platform is built upon ROS environment for easy integration to automated vehicle platforms. This interface will allow the system developer to perform testing and troubleshooting by visualizing all input and output data (e.g.

detections of road objects, encoded messages, feature matching of the V2I signs, and memory/GPU utilization control).

The unavailable roadway geometry information makes automated driving extremely difficult for CAVs in the roadway intersection. To generate a MAP message in compliance with standards, SAE J2735 3/2016 by way of example, a practical online tool, the ISD Message Creator is used (USDOT, 2018). This tool allows users to define the lanes and approaches of an intersection using a graphical interface.

Once designed, the user can encode an ISD, MAP, or SPaT message as an ASN.1 UPER Hex string. After the intersection geometry is defined with the necessary lane attributes, the surveying information is entered for the verified point into the MAP message. The generated MAP message is encoded in tight UPER HEX format. The encoded message structure is also validated using a Connected Vehicle Message Validator tool (USDOT 2017). This validation ensures that the message can be recognized by an OBU 306 that complies with SAE J2735 standard. After completion of MAP message data, the next step is to generate an image identifier that associates with this message in the device database. The vehicular message sign 100 is created to incorporate the features described above and placed at the predefined location near the intersection.

The present invention estimates the real-time location of roadway objects and generate dynamic message data for vehicular communication applications such as personal safety messages (PSM), red-light violation warning, and vulnerable road user avoidance. Therefore, a stereo vision system was integrated in the on-board system 300 for accurate depth estimation. The object distances up to 15 ft are estimated within 1-inch accuracy, up to 50 ft within 5 inches and up to 100 ft within 1 ft.

When the V2I identifier (optical code 400) is recognized, the associated MAP message is decoded and displayed on the human machine interface (HMI) including the lane geometries, signage and pedestrian crossings.

For red-light violation warning for rural area vehicular communication applications through the use of the present invention, a relatively small, custom designed architecture is developed using Keras wrapper library with Tensorflow backend. The classifier architecture has four convolutional layers and over six million trainable parameters. The model is trained on an open source traffic light color classification dataset for autonomous vehicles (Kato et al., 2018).

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The invention claimed is:

1. An infrastructure to vehicle communications system comprising:
    a full spectrum camera disposed on a vehicle;
    a sign, disposed away from the vehicle, including a message thereon; the sign reflecting visible light, and at least a portion of the message being an optical code; the optical code not reflecting visible light and reflecting invisible light; the full spectrum camera capturing an image of the sign including the optical code;
    a smart vision device receiving the image and determining the existence of the sign from the reflected visible light and the optical code thereon from the reflected invisible light;
    an on board unit having a data base, the data base storing one or more optical codes and one or more messages associated with a respective optical code, the on board unit configured to determine an optical code message from the one or more messages as a function of an optical code in the image, and displaying the optical code message at a display in the vehicle;
    an antenna for communication with an information and communication network; the information and communication network is configured to transmit the message to be received at the antenna when the vehicle is in communication range of the information and communication network, the on board unit displaying the message received from the information and communication network at the screen; and
    a GPS receiver on board the vehicle for determining the location of the vehicle, the GPS sensor being in communication with the on board unit and sending a location signal indicating that the vehicle is in communication range of the information and communication network, and the on board unit stopping the processing of optical codes in response to the location signal.

2. The infrastructure to vehicle system of claim 1, wherein the invisible light is in the infrared spectrum.

3. The infrastructure to vehicle system of claim 1, wherein the retrieved message is one of map directions, a road condition, or a warning.

4. The infrastructure to vehicle system of claim 1, further comprising a vehicle control, the on board unit receiving the image and providing an output in response thereto to operate the vehicle control.

5. The infrastructure to vehicle system of claim 4, where in the vehicle control is a brake control.

6. An infrastructure to vehicle communications system comprising:
    a full spectrum camera disposed on a vehicle, the full spectrum camera capturing reflected visible light and reflected invisible light reflected from an object outside the vehicle to create an image of the object;
    a smart vision device receiving the image and determining the existence of the sign from the reflected visible light and an optical code thereon from the reflected invisible light; and
    an on board unit having a data base, the data base storing one or more optical codes and one or more messages associated with a respective optical code, the on board unit configured to determine an optical code message from the one or more messages as a function of an optical code in the image, and displaying the optical code message at a display in the vehicle;
    an antenna for communication with an information and communication network; the information and communication network transmitting the message to be received at the antenna when the vehicle is in communication range of the information and communication network, the on board unit displaying the message received from the information and communication network at the screen; and a GPS receiver on board the vehicle for determining the location of the vehicle, the GPS sensor being in communication with the on board unit and sending a location signal indicating that the vehicle is in communication range of the information and communication network, and the on board unit stopping the processing of optical codes in response to the location signal.

7. The infrastructure to vehicle system of claim 6, wherein the invisible light is in the infrared spectrum.

8. The infrastructure to vehicle system of claim 6, wherein the retrieved message is one of map directions, a road condition, or a warning.

9. The infrastructure to vehicle system of claim 6, further comprising a vehicle control, the on board unit receiving the image and providing an output in response thereto to operate the vehicle control.

10. The infrastructure to vehicle system of claim 9, where in the vehicle control is a brake control.

* * * * *